United States Patent [19]

Fleege et al.

[11] Patent Number: 5,894,405
[45] Date of Patent: Apr. 13, 1999

[54] ASSEMBLY AND METHOD FOR MOUNTING MULTIPLE CIRCUIT BREAKERS

[75] Inventors: Dennis William Fleege; Randall Luther Siebels, both of Cedar Rapids, Iowa

[73] Assignee: Square D Company, Palatine, Ill.

[21] Appl. No.: 08/971,741

[22] Filed: Nov. 17, 1997

[51] Int. Cl.⁶ .................................................. H02B 1/04
[52] U.S. Cl. .......................... 361/634; 361/652; 361/656; 361/673; 200/293
[58] Field of Search ..................................... 361/634, 635, 361/636, 643, 652, 673, 837; 200/293, 294

[56] References Cited

U.S. PATENT DOCUMENTS

| | | | |
|---|---|---|---|
| 3,150,290 | 9/1964 | Edmunds | 361/635 |
| 3,404,317 | 10/1968 | Sabatella | 361/634 |
| 4,742,608 | 5/1988 | M'Sadoques et al. | 361/634 |
| 4,821,144 | 4/1989 | Grass | 361/634 |
| 5,279,487 | 1/1994 | Mrenna et al. | 361/634 |
| 5,761,026 | 6/1998 | Robinson et al. | 361/627 |

*Primary Examiner*—Leo P. Picard
*Assistant Examiner*—Boris L. Chervinsky

*Attorney, Agent, or Firm*—Larry I. Golden; Kareem M. Irfan

[57] ABSTRACT

The present invention provides an assembly and method for mounting a plurality of circuit breakers for electrical and mechanical connection to a bus bar in a module of a distribution board. The mounting assembly includes each circuit breaker having a housing which is defined by a contact end for connecting to the bus bar, a mounting end for securing to the cell of the distribution board, and side panels extending therebetween. Each housing has a top surface and a bottom surface. The connect end of each housing has a bus bar terminal for connecting to the bus bar. At least one spacer is located between at least two of the circuit breakers. The spacer has a predetermined width between the side panels of adjacent circuit breakers. The spacer width is sufficient to spread the circuit breakers apart from each other and align the bus bar terminal of each housing with the busbar. A bracket is also provided with spacing flanges having a predetermined width to extend between the side panels of the circuit breakers sufficient to spread the circuit breakers apart from each other and align the connect ends of the circuit breakers with the busbar. Preferably, the mounting assembly pivotally mounts a line terminal within the housing of the circuit breaker permitting the slot of a contact jaw to move freely in a direction perpendicular to the busbar.

16 Claims, 4 Drawing Sheets

ASSEMBLY AND METHOD FOR MOUNTING MULTIPLE CIRCUIT BREAKERS

FIELD OF THE INVENTION

This invention relates to an assembly and method for mounting multiple circuit breakers within a module or cell of a distribution board originally configured to accommodate circuit breakers having a different physical size. More particularly, the housing and electrical terminals of the circuit breaker assembly are adapted to fit into a multiphase busbar having a configuration to accommodate an assembly of a different size.

BACKGROUND OF THE INVENTION

Modular arrangements of circuit interrupters like circuit breakers for use in commercial and industrial power systems have previously been adapted for attachment to the busbars in panelboards, switchgear, and other distribution boards. These modular arrangements serve to establish electrical connections to service lines and allow for outgoing connections to the branch circuits.

Some of the well known distribution boards provide modules or cells which accept circuit breakers having a width of about 1½ inch. Attempting to assemble and insert circuit breakers having a width other than 1½ inch into a module or cell of this type could result in serious misalignment of the electrical and mechanical connections between the circuit breaker and the busbar.

The technological advances of the art have enabled smaller, more powerful circuit breakers to be developed. While these new circuit breakers have been able to put more power in less space, many end users of distribution systems currently have cells and/or busbars which cannot accommodate the dimensions of the smaller new devices. To avoid the expense of replacing these distribution systems, there is a need to adapt the different dimensional size and electrical contacts of the new circuit breakers with existing cells and/or busbar contacts.

Another problem encountered by busbars and the modular or cell arrangement of the distribution boards lies in making the connection between the circuit breaker and the busbar. When resilient contact jaws are used by the circuit breaker to connect to the busbars, the force required to make the physical connection to the busbar is substantial. Making this connection becomes even more difficult when the contact jaws do not precisely align with the busbars. Additional force may be needed to compensate for the misalignment.

There is a need for mounting an assembly of circuit breakers to a module or cell of a distribution board where the module or cell was originally made to accommodate circuit breakers of a different, usually larger, physical size. Additionally, there is a need for a new and improved circuit breaker assembly which provides a movable contact jaw to ensure accurate alignment of the circuit breaker and the busbar in the distribution board.

SUMMARY OF THE INVENTION

The present invention provides an assembly for mounting a plurality of circuit breakers for electrical and mechanical connection to a bus bar in a module of a distribution board. The mounting assembly includes each circuit breaker having a housing which is defined by a contact end for connecting to the bus bar, a mounting end for securing to the cell of the distribution board, and side panels extending therebetween. Each housing has a top surface and a bottom surface. The connect end of each housing has a bus bar terminal for connecting to the bus bar. At least one spacer is located between at least two of the circuit breakers. The spacer has a predetermined width between the side panels of adjacent circuit breakers. The spacer width is sufficient to spread the circuit breakers apart from each other and align the bus bar terminal of each housing with the busbar. A shroud surrounds the periphery of the bus bar terminal for each circuit breaker. The shroud has a top surface and a bottom surface and is attached to the contact end of each housing. The top surface and bottom surface of each housing is inserted between the shroud top surface and bottom surface respectively. At least one pair of apertures on the shroud top surface and bottom surface are positioned over the spacer between the housings of the circuit breakers. The pair of apertures are adapted to receive a fastener extending through the shroud top surface aperture, connecting to the housings of the circuit breakers, and extending through the shroud bottom surface aperture.

The present invention also provides a bracket for mounting a plurality of circuit breakers for electrical and mechanical connection to a bus bar in a distribution board. The bracket has a generally planar body having a top surface and a bottom surface. A pair of spacing flanges upstand from the top surface of one end of the body to form a u-shaped channel wherein the top surface of the body at the one end forms the bight of the channel. The spacing flanges have a predetermined width to extend between the side panels of the circuit breakers sufficient to spread the circuit breakers apart from each other and align the connect ends of the circuit breakers with the busbar. The spacing flanges have a distal end for receiving a spacing fastener which secures the flanges to the circuit breakers. The bracket includes at least one securing flange upstanding from the bottom surface of the opposing end of the body. The securing flange has a distal end adapted for receiving a fastener to secure the flange to the distribution board.

Another assembly is provided by the present invention for mounting a plurality of circuit breakers for electrical and mechanical connection to a bus bar in a cell of a distribution board. The mounting assembly includes each circuit breaker having a housing defined by a contact end for connecting to the bus bar, a mounting end for securing to the cell of the distribution board, and side panels extending therebetween. A bus bar terminal connects to the bus bar and the connect end of the circuit breakers. The bus bar terminal includes a contact jaw for connecting to the bus bar. The jaw has a slot defined between two prongs for receiving the bus bar in a press-fit therebetween. A bus has a first and second end with the first bus end secured to the contact jaw. A line terminal has a first end and a second end with the first line terminal end secured to the second bus end and the second line terminal end connected to the interior of the housing. The mounting assembly includes means for pivotally mounting the line terminal within the housing of the circuit breaker permitting the slot of the contact jaw to move freely in a direction perpendicular to the busbar by pivoting the first line terminal end connected to the second bus end which moves the first bus end secured to the contact jaw.

A method is provided by the present invention for mounting a plurality of circuit breakers for electrical and mechanical connection to a bus bar in a cell of a distribution board. The method includes spacing apart at least two of the circuit breakers a predetermined width between the side panels of the circuit breakers sufficient to spread the circuit breakers apart from each other and align the connect ends of the circuit breakers with the busbar.

3

The new and improved circuit breaker assembly of the present invention provides the ability to adapt single circuit breakers or other electrical distribution devices with a width of less than 1½ inch, to fit existing electrical busbars designed for 1½ inch modules.

It is an object of the present invention to provide the ability to assemble multiple circuit breakers having varying widths to fit pre-existing distribution boards having modules or cells of a different size.

Another object of the present invention is to provide a more reliable attachment of the mounting bracket to the breaker pole assembly by sandwiching the mounting flanges between the spacers used to adjust the width requirements of the breakers.

A further object of the present invention is to provide a means of properly aligning the protective shroud on the breaker pole assembly by the use of spacer tubes or guides and fastening the two components together.

Another object of the present invention is to provide flexibility of alignment between the contact jaw clamps and the contact on a busbar by pivotally mounting the circuit breaker line terminal within the circuit breaker housing.

Other and further advantages, embodiments, variations and the like will be apparent to those skilled in the art from the present specification taken with the accompanying drawings and appended claims.

BRIEF DESCRIPTION OF THE DRAWINGS

In the drawings, which comprise a portion of this disclosure, but are not to scale.

DETAILED DESCRIPTION OF THE INVENTION

Figure 1:
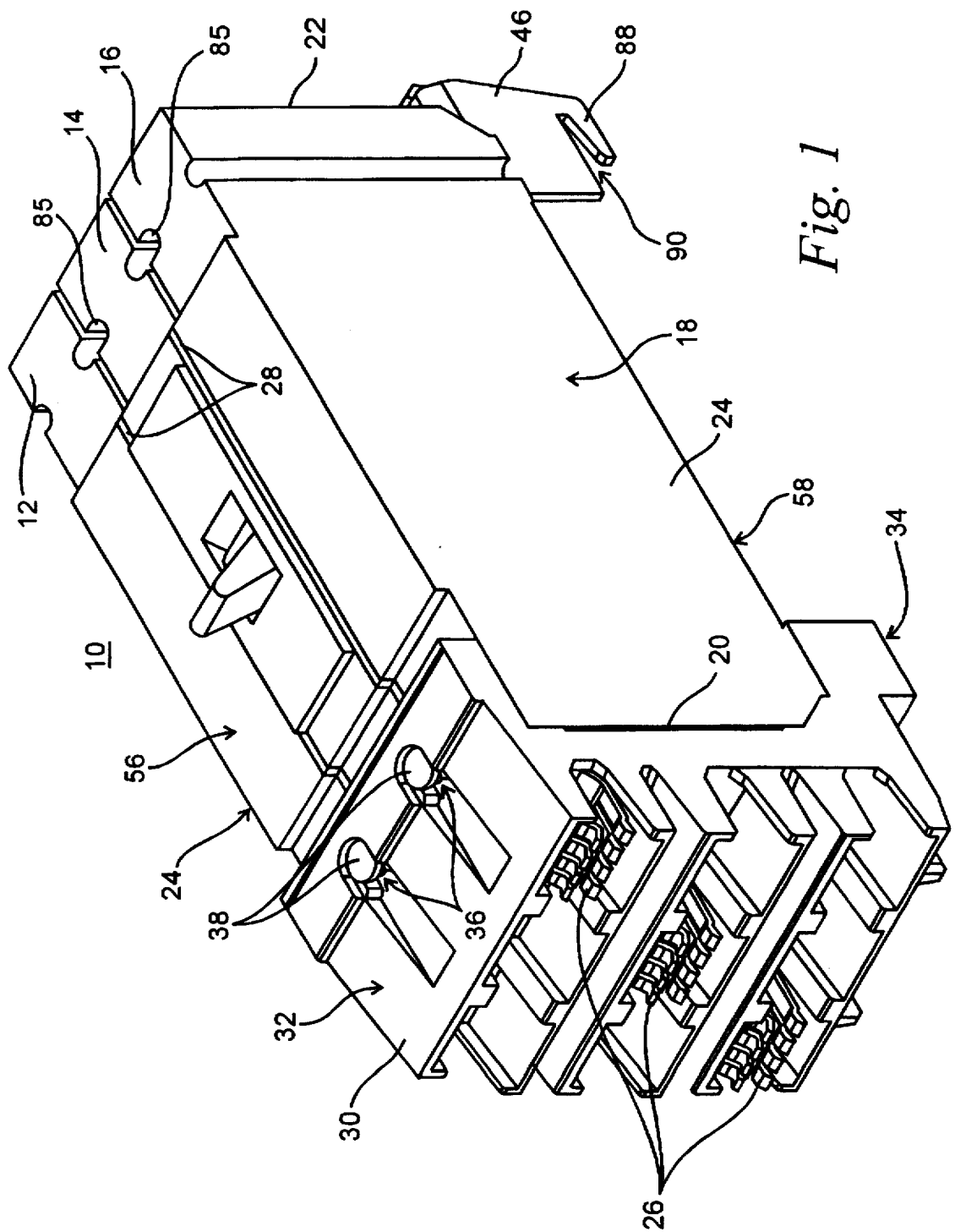
FIG. 1 shows an isolated, perspective view of an assembly of multiple circuit breakers in accordance with the present invention.
Figure 2:
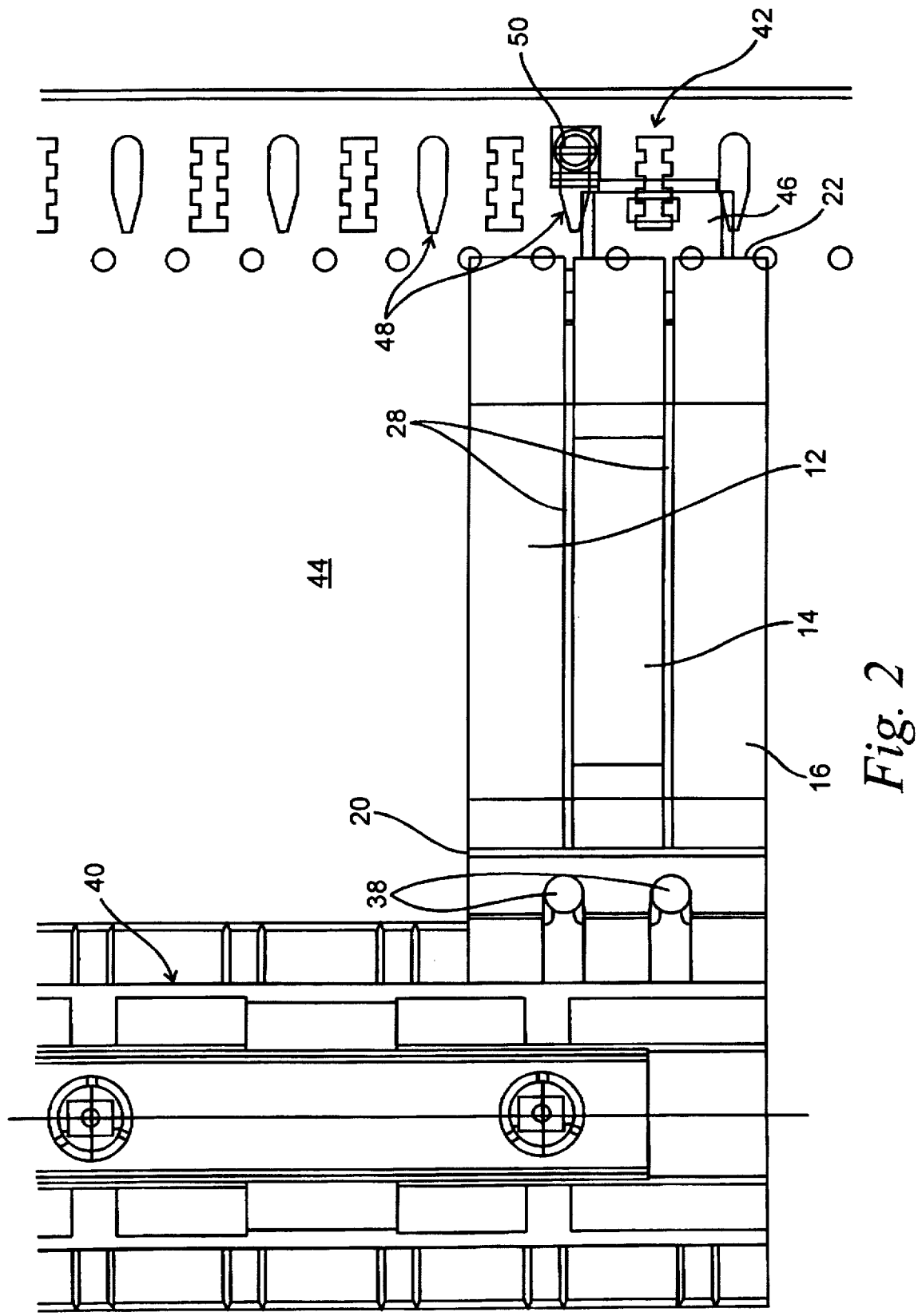
FIG. 2 is a top plan view of the inventive assembly of circuit breakers as illustrated in FIG. 1 while engaging a busbar and module of a distribution board.

With reference to FIGS. 1 and 2, the assembly of the present invention, generally referred to as 10, includes a plurality of circuit breakers 12, 14, and 16. Each circuit breaker like 16 has a housing 18 defined by a contact end 20 for connecting to a bus bar 40 with a bus bar terminal 26, a mounting end 22 for securing to a module 42 of a distribution board 44, and side panels 24 extending therebetween.

At least one spacer 28 is located between the side panels 24 of the pairs of circuit breakers 16 and 14, as well as circuit breakers 14 and 12. The spacers 28 have a predetermined width between the side panels 24 of the circuit breakers sufficient to spread the circuit breakers apart from each other and align the bus bar terminal, generally referred to as 26, of the contact ends 20 of the circuit breakers with the busbars 40. Preferably, the spacers 28 are about the same size as the side panels 24 of the circuit breakers along two-dimensions.

The assembly 10 includes a shroud 30 for surrounding the periphery of the bus bar terminal 26 for each circuit breaker.

4

The shroud 30 is attached to the contact ends 20 of the circuit breakers. The shroud 30 has a top surface 32 and a bottom surface 34 with recessed apertures 36 which are adapted to receive a rivet 38 in each aperture. Other fasteners such as, but not limited to, screws and bolts are also suitable.

The busbars 40 are preferably a multiphase I-LINE™ type electrical busbar as is typically used in power distribution systems and manufactured by the Square D Company. The width of each of the three single pole circuit breakers, 12, 14 and 16, is less than 1½ inch. To allow the assembly 10 to properly fit into a multiphase I-LINE™ type busbar, the three single pole circuit breakers are separated by spacers 28. The spacers 28 have a width which when inserted between the circuit breakers 12, 14 and 16 will align the circuit breakers with the 1½ inch module electrical contacts on the busbars 40.

Once the bus bar terminals 26 of the assembly 10 are engaged with the busbars 40, the assembly is further secured in proper position in the module 42 on the distribution board 44 by a mounting bracket 46 connecting to the mounting ends 22 of the circuit breakers. The distribution board 44 contains a plurality of mounting slots 48 spaced for receiving the mounting bracket 46 therein. A mounting screw 50 extends through and secures the mounting bracket 46 to the distribution board 44.

Figure 3:
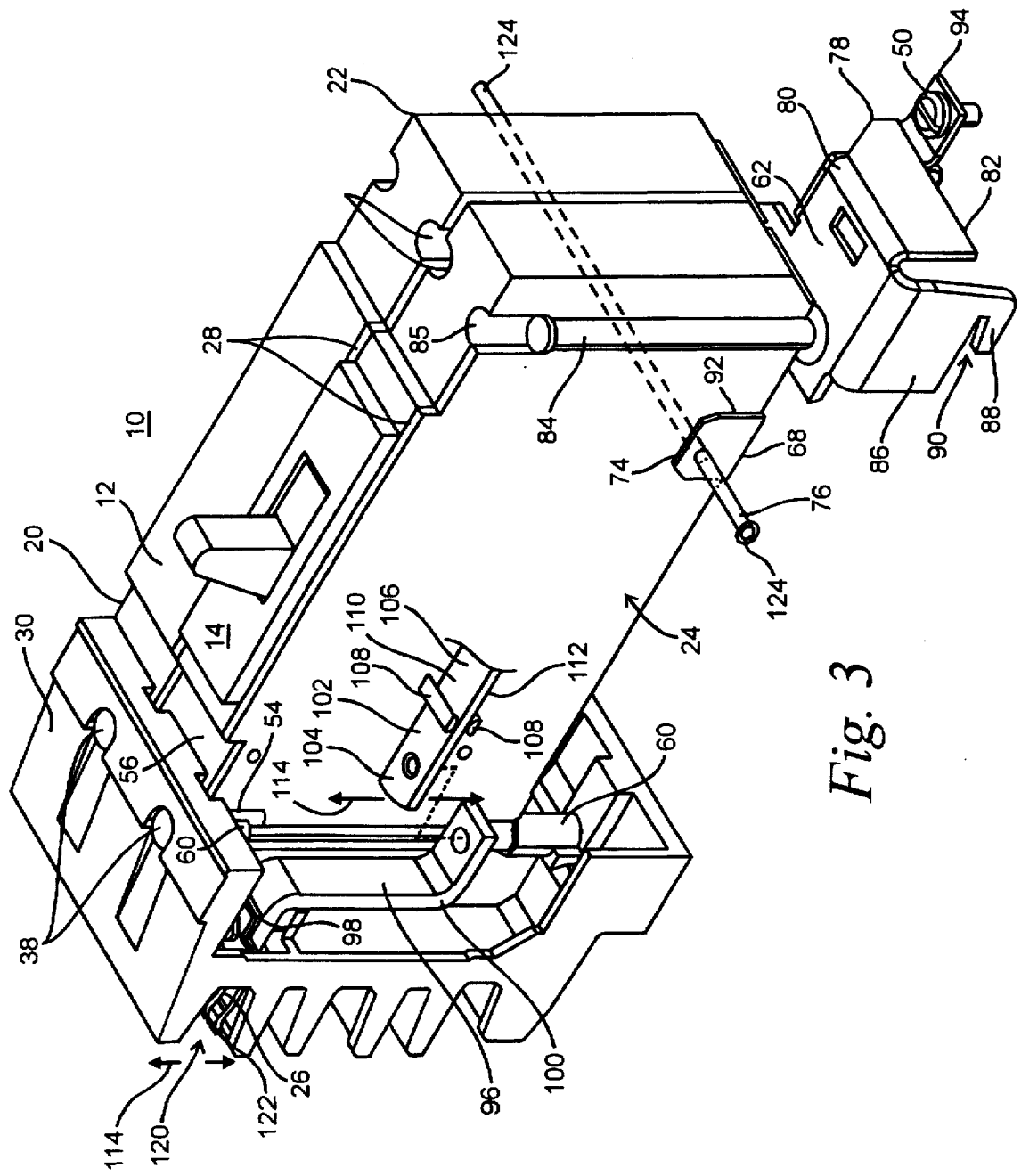
FIG. 3 is an isolated, perspective view of the inventive assembly of the present invention with one of the individual circuit breakers removed to more clearly show additional details of the present invention.

In FIG. 3 the assembly 10 is shown with one of the circuit breakers 16 removed to further illustrate the present invention. As previously described, the shroud 30 is attached to the assembly 10 by rivets 38 which pass through a recessed aperture 36 in the top surface 32 of the shroud to the bottom surface 34. The exterior of the housing 18 for each circuit breaker 12, 14, or 16 is partially defined by a top surface 56 and a bottom surface 58. When the contact end 20 of each circuit breaker is inserted into the shroud 30, the top surface 56 and bottom surface 58 of each circuit breakers abuts the respective undersides of the top surface 32 and bottom surface 34 of the shroud. The rivets 38 are then flared against the bottom surface of the hollow guide tubes 60.

The recessed apertures 36 are located so that it aligns with the area between the individual circuit breakers. Recessed depressions 54 are provided in the exterior of the housing 18 along the side panels 24 in a position to be aligned with the rivets 38 near the top surface 56 and bottom surface 58 of the housing 18 for each circuit breaker. If the diameter of each of the rivets 38 is about equal to or less than the space between the circuit breakers 12, 14, and 16, hollow guide tubes 60 are inserted into and retained within a pair of the recessed depressions 54. The guide tubes 60 center the rivets 38 and secure the shroud 30 to the housing 18 of each circuit breaker so that the shroud 30 is interlocked by one of the rivets 38 to each guide tube 60 inserted and retained by one of the pairs of recessed depressions 54.

Figure 4:
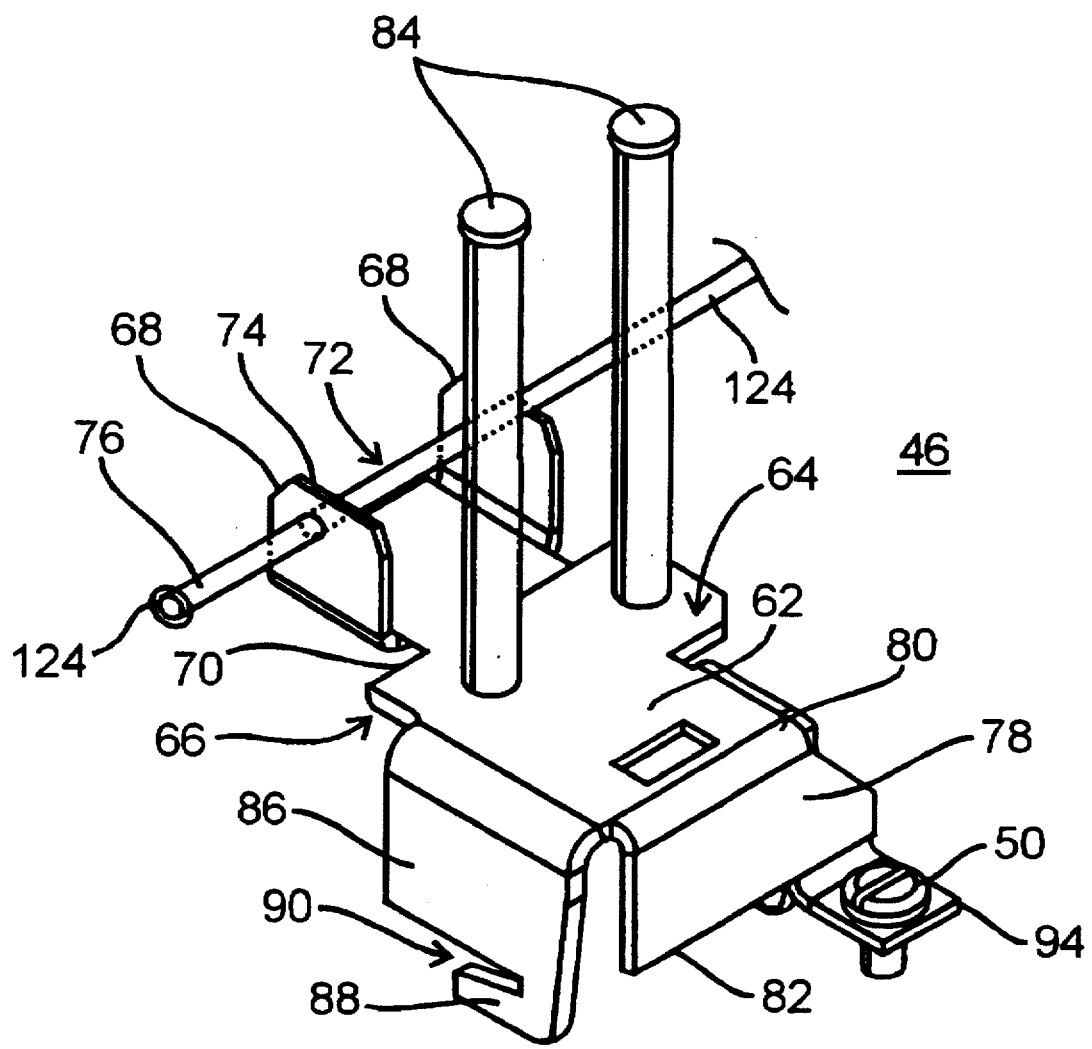
FIG. 4 is an isolated, perspective view of a mounting bracket for the circuit breaker assembly of the present invention.

The mounting bracket 46 is illustrated in more detail in FIGS. 3 and 4. The mounting bracket 46 includes a generally planar body 62 having a top surface 64 and a bottom surface 66. A pair of spacing flanges 68 are integrally formed with and are upstanding from the top surface 64 of one end 70 of the body to form a u-shaped channel 72. The top surface 64 of the body at the one end 70 forms the bight of the channel 72 which abuts the bottom surface 58 of the housing 18 for circuit breaker 14. The spacing flanges 68 extend between the side panels 24 of the circuit breakers and are sufficiently wide to spread the circuit breakers apart from each other and align the bus bar terminals 26 on the connect ends of the circuit breakers with the busbars. Each of the spacing flanges 68 have a distal end 74 for receiving a spacing rivet 76 or other fastener to secure the spacing flanges 68 to the circuit breakers. The spacing rivet 76 extends laterally through the housings 18 of the circuit breakers. The ends 124 of the spacing rivet 76 have heads and/or nuts which abut the outermost side panels 24 of the outermost circuit breakers 12 and 16 to attach thereto.

Preferably, the spacers 28 have an appropriate area cutout 92 for receiving the spacing flanges 68 of the mounting bracket between the side panels 24 of the circuit breakers. The cutouts 92 in the spacers are the same shape as the spacing flanges 68 and are designed to allow the spacing flanges 68 to easily slide into them while retaining a secure fit.

The mounting bracket 46 also includes at least one securing flange 78 upstanding from the bottom surface 66 of the opposing end 80 of the body. The securing flange 78 has a distal end 82 adapted for receiving the mounting screw 50 to secure the securing flange 78 to the distribution board 44.

Securing rivets 84 also secure the assembly 10 to the mounting bracket 46. A second set of recessed depressions 85 are provided in the exterior of the housing 18 along the side panels 24 in a position to be aligned with the securing rivets 84 near the top surfaces of the housings 18 for the circuit breakers. The securing rivets 84 are inserted along the second set of recessed depressions 85 at the ends of the spacers 28 and pass through the mounting bracket 46. After insertion, the securing rivets 84 rest at the bottoms of the second set of recessed depressions 85. The securing rivets 84 are then flared on the bottom surface 66 of the mounting bracket. At the point where the securing rivets 84 penetrate the mounting bracket 46, a small tap or pre-formed depression is preferably located to make insertion of the securing rivets 84 through the mounting bracket 46 easier.

The mounting bracket 46 preferably includes a pair of hook flanges 86 upstanding from the bottom surface 66 near the opposing end 80 of the body. Each hook flange 86 has a distal end 88 with an open-ended slot 90 for receiving the distribution board 44. Referring briefly to FIG. 2, when the circuit breakers 12, 14, and 16 are in electrical connection with the bus bar 40, the distribution board 44 inserted into the open-ended slot 90 secures the assembly 10 from moving in a perpendicular direction relative to the distribution board.

Preferably, the distal end 82 of the securing flange is integrally formed with a L-shape flange 94 pre-formed to abut the distribution board in a flush arrangement. The L-shape flange 94 includes a hole for receiving the mounting screw 50 therethrough and tighten the L-shape flange 94 to the distribution board 44.

When force is applied to the assembly 10 in order to engage the assembly 10 onto the busbar 40, the hook flanges 86 extend through the mounting slots 48 to insert the distribution board into the open-ended slots 90. The mounting slots 48 preferably have a multi-slotted outline to better grip the hooks flanges 86 and more securely hold the assembly 10 to the distribution board 44. While movement of the assembly 10 perpendicular to the distribution board is restrained by the hook flanges 86, the distribution board 44 is retained in the open-ended slot 90 and movement parallel to the distribution board 44 is restrained by the mounting screw 50 and L-shaped flange 94.

FIG. 3 also illustrates the advantageous electrical connection provided by the present invention between the contact end 20 of each circuit breaker and the bus bar 40 (FIG. 2). Preferably, the bus bar terminal 26 is a contact jaw for connecting directly to the bus bar 40. The contact jaw has a slot 120 defined between two prongs 122 for receiving the bus bar in a press-fit therebetween. The bus bar terminal also includes a bus 96 which has a first end 98 and second end 100. The first bus end 98 is secured directly to the contact jaw.

The bus bar terminal 26 also includes a line terminal 102 which positioned within the interior of the housing 18 of each circuit breaker. In FIG. 3, the line terminal 102 has been isolated by removing the housing 18 of circuit breaker 16 for the sake of clarity. The line terminal 102 has a first end 104 and a second end 106. The first line terminal end 104 is secured to the second bus end 100. The second line terminal end 106 is connected to the circuit breaker in the interior of the housing 18 such as to the electrical contacts of an operating mechanism (not shown). The line terminal 102 is positioned between a pair of opposing stops 108 on opposite sides 110 and 112 of the line terminal. The opposing stops 108 are located in a stationary position within the housing 18 of each circuit breaker. The opposing stops 108 provide fulcrums on the opposing sides 110 and 112 of the line terminal in order to pivot the first line terminal end 104 as indicated by arrows 114. Pivotally mounting the line terminal 102 within the housing 18 of the circuit breaker permits the slot 120 of the contact jaw to move freely in a direction perpendicular to the busbar 40 by pivoting the first line terminal end 102 secured to the second bus end 100 which moves the first bus end 98 secured directly to the contact jaw. The shroud 30 provides sufficient space around the periphery of the contact jaw prongs 122 to allow for their movement without restriction.

The pivotal mounting of the bus bar terminal 26 is particularly advantageous when the contact jaw must engage with the busbar 40 as seen in FIG. 2. There is often a significant resistive force to the engagement. A slight misalignment of the contact jaw slot 120 and bus bar 40 during the engagement can magnify this resistive force. The pivotal mounting of the present invention allows the entire bus bar terminal 26 or other conducting mechanism to precisely adjust to the exact location where the contact jaw slot 120 need to engage with the busbar 40.

In a multi-phase distribution board 44, each circuit breaker 12, 14, and 16 connects to a different location for each phase. To adjust for the differences in elevation between each phase, the length of the bus 96 secured to the contact jaw and line terminal 102 for each circuit breaker is different to compensate for elevation.

Although one embodiment of an assembly of three circuit breakers has been specifically illustrated in the drawings, the present invention is not so limited. Assemblies containing only two circuit breakers or more than three circuit breakers are also included. In the manner described above, spacers would be placed between the pair, or multiple pairs of circuit breakers. The number of rivets and securing rivets can be adjusted to the number of circuit breaker pairs. The length of the spacing fastener is also adjustable to accommodate a different number of circuit breaker pairs than specifically illustrated. Not all of the spacers need to have the same width. The width of each spacer can vary to adjust to the width of each circuit breaker and the dimensions of the module or cell in the distribution board. It may not be necessary to have a spacer between every pair of circuit breakers in the assembly to provide for proper mounting alignment.

As those skilled in the art will appreciate, the inventive assembly can be adapted and configured for use with a wide variety of circuit breakers and other circuit interrupters. The present invention is suitable for use in low, medium, and high voltage applications and in various phase configurations. The term circuit breaker is defined to include all types of circuit interrupters as well as, but not be limited to, single or polyphase circuit breakers, vacuum or air breakers, fusible switches, and the like. The term distribution board is used herein to denote electrical distribution equipment for providing electrical power to multiple circuit breakers and includes, but is not limited to switchgear, panelboards, and the like. The terms module and cell are used interchangeably to indicate the mounting area on or in a distribution board which aligns the circuit breaker properly for making an electrical connection to the bus bar.

While particular embodiments and applications of the present invention have been illustrated and described, it is to be understood that the invention is not limited to the precise construction disclosed herein and that modifications, changes, and variations which will be apparent to those skilled in the art may be made in the arrangement, operation and details of construction of the invention disclosed herein without departing from the spirit and scope of the invention as defined in the appended claims.

What is claimed is:

1. An assembly for mounting a plurality of circuit breakers for electrical and mechanical connection to a bus bar in a module of a distribution board, the mounting assembly comprising:

each circuit breaker having a housing being defined by a contact end for connecting to the bus bar, a mounting end for securing to the cell of the distribution board, and side panels extending therebetween, each housing having a top surface and a bottom surface, the contact end of each housing having a bus bar terminal for connecting to the bus bar;

at least one spacer located between at least two of the circuit breakers, the spacer having a predetermined width between the side panels of adjacent circuit breakers, the spacer width being sufficient to spread the circuit breakers apart from each other and align the bus bar terminal of each housing with the busbar;

a shroud for surrounding the periphery of the bus bar terminal for each circuit breaker, the shroud having a top surface and a bottom surface, the shroud being attached to the contact end of each housing, the top surface and bottom surface of each housing being inserted between the shroud top surface and bottom surface respectively; and at least one pair of apertures on the shroud top surface and bottom surface, the pair of apertures being positioned over the spacer between the housings of the circuit breakers, the pair of apertures adapted to receive a fastener, the fastener extending through the shroud top surface aperture, connecting to the housings of the circuit breakers, and extending through the shroud bottom surface aperture.

2. The assembly of claim 1 wherein exteriors of the housings of adjacent pairs of circuit breakers include pairs of recessed depressions at the contact end near the top surface and bottom housing surfaces; and the assembly includes a plurality of guide tubes, each guide tube adapted to be inserted into and be retained by one of the pairs of recessed depressions and receive therethrough the fastener so that the shroud is interlocked by the fastener to each guide tube inserted and retained by one of the pairs of recessed depressions.

3. The assembly of claim 1 wherein the apertures are recessed within the top surface and bottom surface of the shroud to prevent the fastener from extending above the top or bottom surface of the circuit breaker.

4. The assembly of claim 1 wherein the assembly includes a spacing fastener extending laterally through the side panels of each housing of the circuit breakers, the spacing fastener having two ends which abut the side panels of the two outermost housings of the circuit breakers.

5. The assembly of claim 1 wherein the assembly further includes:

a bracket having a generally planar body having a top surface and a bottom surface;

a pair of spacing flanges upstanding from the top surface of one end of the body to form a u-shaped channel wherein the top surface of the body at the one end forms a bight of the channel, the spacing flanges having a predetermined width to extend between the side panels of the circuit breakers sufficient to spread the circuit breakers apart from each other and align the connect ends of the circuit breakers with the busbar, the spacing flanges having a distal end for receiving a spacing fastener to secure the flanges to the circuit breakers; and at least one securing flange upstanding from the bottom surface of the opposing end of the body, the securing flange having a distal end adapted for receiving a fastener to secure the flange to the distribution board.

6. The assembly of claim 5 wherein the body further includes:

at least one hook flange upstanding from the bottom surface near the opposing end of the body, the having a distal end with an open-ended slot for receiving the distribution board therein when the circuit breakers are in electrical connection with the bus bar and to secure the circuit breakers in a perpendicular direction relative to the distribution board.

7. The assembly of claim 5 wherein exteriors of the housings of adjacent pairs of circuit breakers include a pair of recessed depressions at the mounting end near the top surface of the bracket; the top surface of the bracket includes at least one aperture positioned under the spacer between the housings of the circuit breakers, the aperture adapted to receive a securing fastener, the securing fastener connecting to the bottoms of the pair of recessed depressions and through the top surface of the bracket so that the bracket is interlocked by the securing fastener to the pair of recessed depressions.

8. The assembly of claim 1 wherein the bus bar terminal includes:

a contact jaw for connecting to the bus bar, the jaw having a slot defined between two prongs for receiving the bus bar in a press-fit therebetween;

a bus having a first and second end, the first bus end secured to the contact jaw;

a line terminal a first end and a second end, the first line terminal end secured to the second bus end and the second line terminal end connected to the interior of the housing; and means for pivotally mounting the line terminal within the housing of the circuit breaker permitting the slot of the contact jaw to move freely in a direction perpendicular to the busbar by pivoting the first line terminal end connected to the second bus end which moves the first bus end secured to the contact jaw.

9. The assembly of claim 8 wherein the pivotal mounting means is a pair of opposing stops located in a stationary position on opposite sides of the line terminal providing fulcrums pivoting the first line terminal end connected to the second bus end which moves the first bus end secured to the contact jaw.

10. The assembly of claim 8 wherein the contact jaw for each circuit breaker corresponds to a different phase of the bus bar and is positioned at a different elevation within the shroud.

11. A bracket for mounting a plurality of circuit breakers for electrical and mechanical connection to a bus bar in a distribution board, each circuit breaker defined by a contact end for connecting to the bus bar, a mounting end for securing to the cell of the distribution board, and side panels extending therebetween, the connecting end of each circuit breaker having a bus bar terminal for connecting to the bus bar, the mounting bracket comprising:

a generally planar body having a top surface and a bottom surface;

a pair of spacing flanges upstanding from the top surface of one end of the body to form a u-shaped channel wherein the top surface of the body at the one end forms a bight of the channel, the spacing flanges having a predetermined width to extend between the side panels of the circuit breakers sufficient to spread the circuit breakers apart from each other and align the connect ends of the circuit breakers with the busbar, the spacing flanges having a distal end for receiving a spacing fastener to secure the flanges to the circuit breakers; and at least one securing flange upstanding from the bottom surface of an opposing end of the body, the securing flange having a distal end adapted for receiving a fastener to secure the flange to the distribution board.

12. The mounting bracket of claim 11 wherein the body further includes:

at least one hook flange upstanding from the bottom surface near the opposing end of the body, the hook flange having a distal end with an open-ended slot for receiving the distribution board therein when the circuit breakers are in electrical connection with the bus bar and to secure the circuit breakers in a perpendicular direction relative to the distribution board.

13. The mounting bracket of claim 11 wherein the distal end of the securing flange is an L-shape flange pre-formed to abut the distribution board in a flush manner, the L-shape flange having a hole for receiving a screw therethrough to secure the L-shape flange to the distribution board.

14. The mounting bracket of claim 11 wherein the top surface further includes at least one aperture positioned under the spacer between the housings of the circuit breakers, the aperture adapted to receive a securing fastener, the securing fastener connecting to the mounting end of each housing of the circuit breakers.

15. An assembly for mounting a plurality of circuit breakers for electrical and mechanical connection to a bus bar in a cell of a distribution board, the mounting assembly comprising each circuit breaker having:

a housing defined by a contact end for connecting to the bus bar, a mounting end for securing to the cell of the distribution board, and side panels extending therebetween;

a bus bar terminal for connecting to the bus bar and the contact end of the circuit breakers, the bus bar terminal including:

a contact jaw for connecting to the bus bar, the jaw having a slot defined between two prongs for receiving the bus bar in a press-fit therebetween;

a bus having a first and second end, the first bus end secured to the contact jaw;

a line terminal having a first end and a second end, the first line terminal end secured to the second bus end and the second line terminal end connected to the interior of the housing; and means for pivotally mounting the line terminal within the housing of the circuit breaker permitting the slot of the contact jaw to move freely in a direction perpendicular to the busbar by pivoting the first line terminal end connected to the second bus end which moves the first bus end secured to the contact jaw.

16. The mounting assembly in claim 15 wherein the pivotal mounting means is a pair of opposing stops located in a stationary position on opposite sides of the line terminal providing fulcrums pivoting the first line terminal end connected to the second bus end which moves the first bus end secured to the contact jaw.

* * * * *